(12) United States Patent
Hirai

(10) Patent No.: US 6,456,330 B1
(45) Date of Patent: *Sep. 24, 2002

(54) REMOTE-CONTROLLED TRANSMITTER AND INFORMATION TRANSFER SYSTEM USING THE SAME

(75) Inventor: Jun Hirai, Tokyo (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/005,947

(22) Filed: Jan. 12, 1998

(30) Foreign Application Priority Data

Jan. 23, 1997 (JP) .............................. 9-010563

(51) Int. Cl.7 ................................. H04N 5/44
(52) U.S. Cl. ........................ 348/460; 348/734; 348/906
(58) Field of Search .......................... 348/734, 12, 460, 348/13, 906; 725/39, 40, 50, 52, 51, 53, 57; 386/83

(56) References Cited

U.S. PATENT DOCUMENTS

| | | | | |
|---|---|---|---|---|
| 4,807,031 A | * | 2/1989 | Broughton et al. | 348/473 |
| 5,247,580 A | * | 9/1993 | Kimura et al. | 348/734 |
| 5,410,326 A | * | 4/1995 | Goldstein | 348/134 |
| 5,721,584 A | * | 2/1998 | Yoshinobu et al. | 348/13 |

FOREIGN PATENT DOCUMENTS

JP 60-32448 * 2/1985 ................. 455/6.3

* cited by examiner

Primary Examiner—David E. Harvey
(74) Attorney, Agent, or Firm—Frommer Lawrence & Haug LLP; William S. Frommer

(57) ABSTRACT

Disclosed herein are a remote-controlled transmitter capable of properly and easily transferring information and an information transfer system using the remote-controlled transmitter. The remote-controlled transmitter is directed toward an information output apparatus and a capture button is operated in this state. A control code signal MB is outputted from a command generator and a remote-control signal RM is outputted from a signal output unit based on the control code signal MB. Based on the remote-control signal RM, information is outputted from the information output apparatus as a modulated sound SO. The sound SO is gathered by a microphone to obtain a signal Smic. The signal Smic is demodulated by a decoder and the demodulated signal is converted into a control code signal MS by a converter. The converted control code signal MS is stored in a memory. The remote-controlled transmitter is directed to a device to be controlled and a transfer button is operated in this condition so that the signal MS is read out from the memory. Based on the read signal MS, a remote-control signal RM is outputted from the signal output unit to transfer the information outputted from the information output apparatus to the device to be controlled.

8 Claims, 3 Drawing Sheets

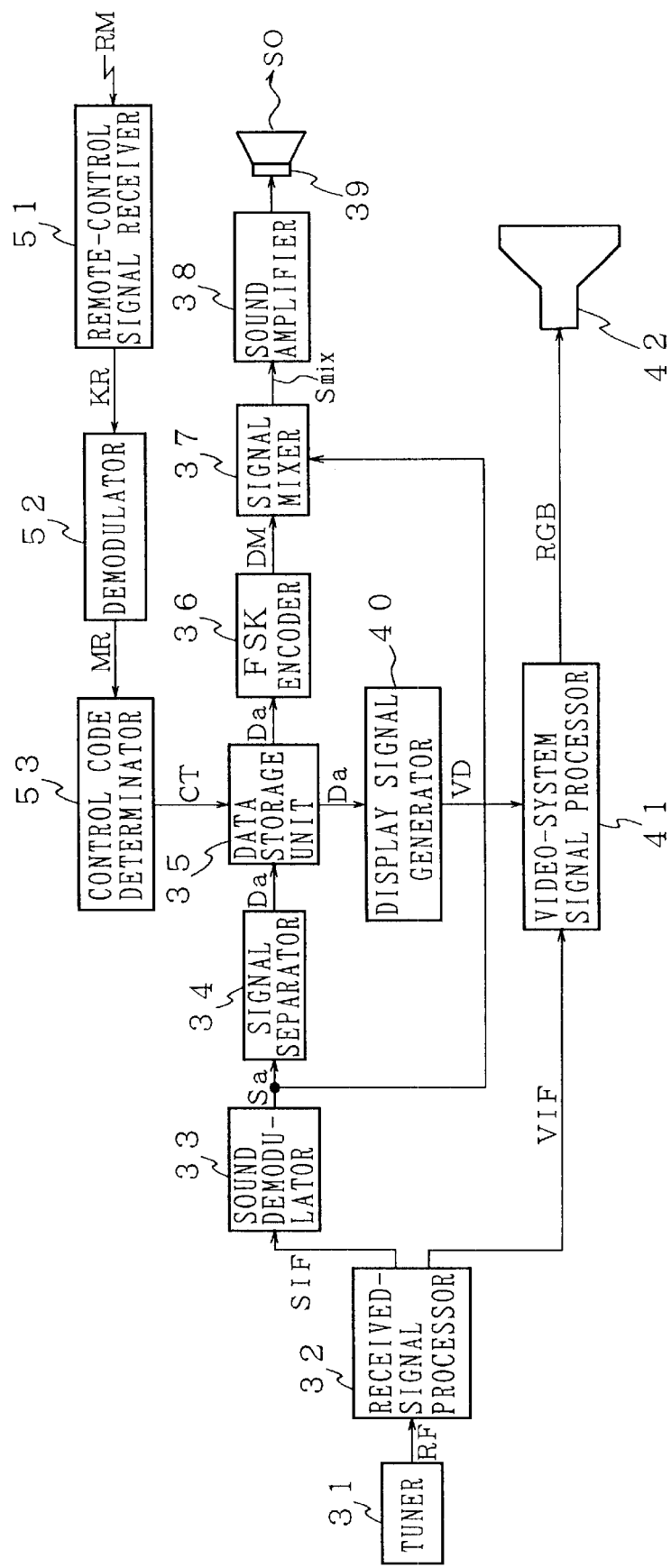

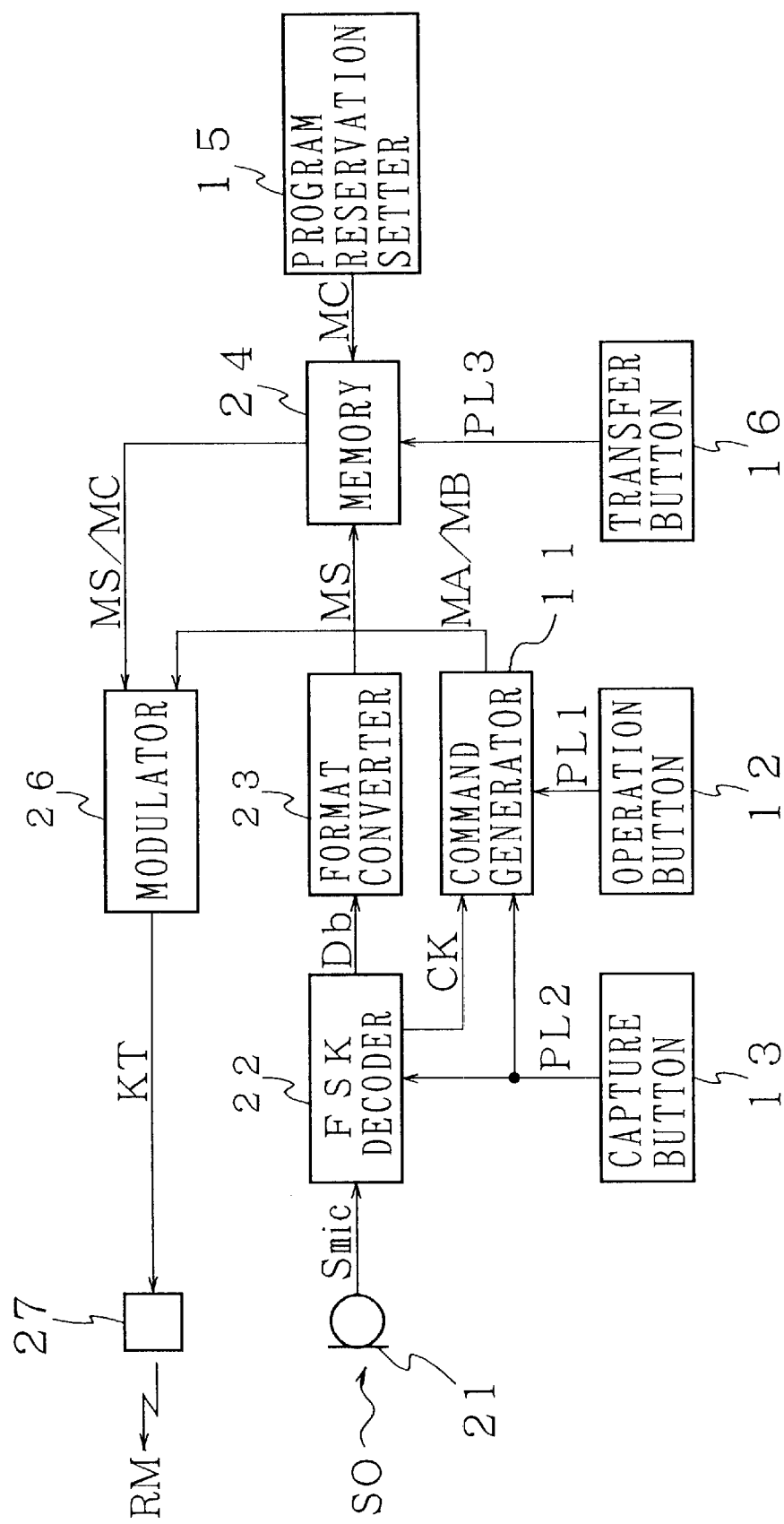

REMOTE-CONTROLLED TRANSMITTER AND INFORMATION TRANSFER SYSTEM USING THE SAME

BACKGROUND OF THE INVENTION

1. Field of the Invention

This invention relates to a remote-controlled transmitter and an information transfer system using it.

2. Description of the Related Art

As has been described in, for example, U.S. Pat. No. 5,537,106, numeric keys or the like of a remote-controlled transmitter are operated to set a recording start time, a recording end time, a recording channel, etc. when it is desired to make a program reservation by the use of a video tape recorder. Further, program reservation information is set using coded G codes (corresponding to program reservation codes developed by U.S. Gemster Development Co., Ltd.).

Meanwhile, such a program reservation must be carried out by examining program reservation information such as times, channels or G codes, etc. from a newspaper, a magazine, etc. and operating the numeric keys or the like of the remote-controlled transmitter based on this examined information. Thus, a program record reserving operation would result in complexity. When this information is kept in mind and the numeric keys are operated in this state, there may be cases where incorrect settings are made.

SUMMARY OF THE INVENTION

With the foregoing in view, it is therefore an object of the present invention to provide a remote-controlled transmitter capable of properly and easily transferring information and an information transfer system using it.

According to one aspect of the present invention, for achieving the above object, there is provided a remote-controlled transmitter comprising:

a microphone for collecting a sound;

signal processing means for generating a control code signal for controlling the operation of a device to be controlled from the sound gathered by the microphone;

memory means for storing the control code signal generated by the signal processing means therein; and signal outputting means for reading the control code signal stored in the memory means, generating a remote-control signal, based on the read control code signal, and outputting the remote-control signal therefrom.

According to another aspect of the present invention, there is provided an information transfer system comprising:

an information output apparatus for converting information data indicative of information used to set the operation of a device to be controlled into a sound and outputting the sound therefrom; and a remote-controlled transmitter for gathering the sound outputted from the information output apparatus to obtain the information data, generating a control code signal for controlling the operation of the device to be controlled based on the information data, and generating a remote-control signal based on the control code signal, and outputting the remote-control signal therefrom.

In the present invention, the information data indicative of the information used to set the operation of the device to be controlled, e.g., program reservation information for making a record reservation by a video tape recorder is frequency-shift keyed and outputted as a sound from the information output apparatus. This sound is gathered by the remote-controlled transmitter to generate a control code signal for controlling the operation of the video tape recorder corresponding to the device to be controlled, based on the obtained information data. Further, a remote-control signal is generated based on the generated control code signal and outputted from the remote-controlled transmitter. In response to the remote-control signal, the video tape recorder makes a record reservation based on the program reservation information outputted from the information output apparatus.

BRIEF DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 2 is a diagram illustrating the configuration of the television system shown in FIG. 1; and FIG. 3 is a diagram depicting the configuration of the remote-controlled transmitter shown in FIG. 1.

DETAILED DESCRIPTION OF THE PREFERRED EMBODIMENT

Figure 1:
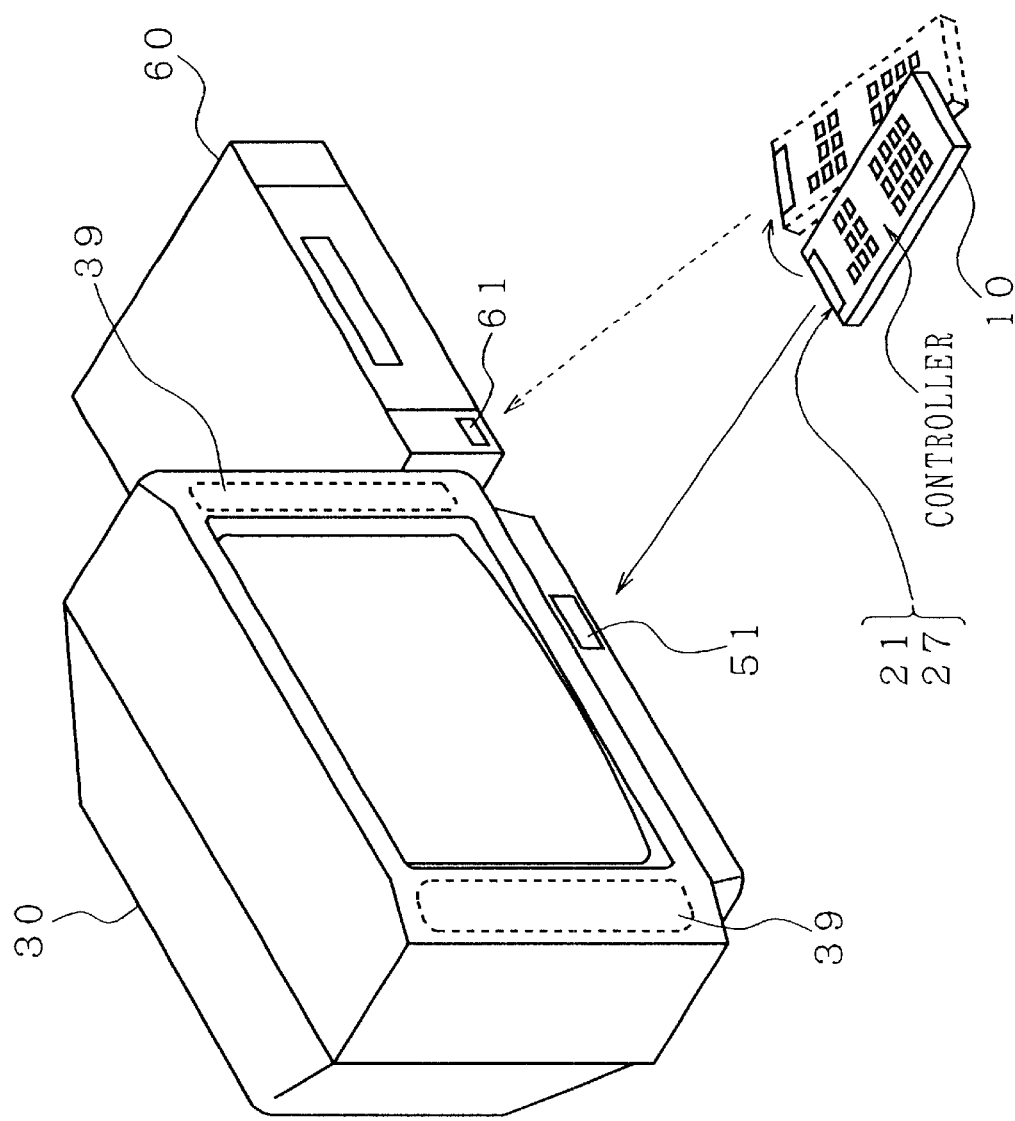
FIG. 1 is a diagram showing the layout of a remote-controlled transmitter and a television system.

One embodiment of an information transfer system according to the present invention will hereinafter be described with reference to the accompanying drawings. Referring to FIG. 1, a remote-controlled transmitter 10 is provided with a microphone 21, and a remote-control signal output unit 27. The microphone 21 and the remote-control signal output unit 27 are constructed in such a manner that the direction in which the sensitivity of the microphone 21 is high, is substantially identical to the direction in which the remote-control signal output unit 27 outputs a signal. Further, speakers 39 and a remote-control signal receiver 51 are placed at the front of a television system or television equipment 30 which serves as an information output apparatus.

The remote-controlled transmitter 10 is operated after the microphone 21 and the remote-control signal output unit 27 have been adjusted so as to be opposite in direction to the remote-control signal receiver 51 of the television system 30 serving as the information output apparatus. Further, information (hereinafter called "program reservation information") or the like such as a record start time, a record end time and channels or the like required to perform program reservations is outputted as a voice or sound SO from the speakers of the television system 30, based on a remote-control signal RM outputted from the remote-controlled transmitter 10. The sound SO is collected by the microphone 21 of the remote-controlled transmitter 10 so that the program reservation information is taken in or brought into the remote-controlled transmitter 10. Thereafter, the remote-control signal output unit 27 of the remote-controlled transmitter 10 is changed so as to be opposite in direction to a remote-control signal receiver 61 of, for example, a video tape recorder 60 serving as a device to be controlled. Thus, the remote-control signal RM indicative of the program reservation information captured by the remote-controlled transmitter 10 is outputted from the remote-control signal output unit 27, whereby the program reservation information is transferred to the video tape recorder 60 where a program reservation is set.

The television system 30 for outputting information therefrom as a sound will now be described in the first place. FIG. 2 is a diagram showing the configuration of the television system 30. In a sound signal of a broadcast wave received by the television system 30, a sound signal indicative of program reservation information is superimposed on a sound signal of a broadcast program. The sound signal indicative of this program reservation information is equivalent to a signal lying within an audio frequency band, which is obtained by, for example, defining the program reservation information as serial text data or the like, adding to the information data, data indicative of the start and end of the information data and error detection and correction data or the like to thereby define it as a signal set to a predetermined format, and subjecting this signal to a frequency shift keying (FSK: Frequency Shift Keying) process.

A received signal RF obtained by receiving a desired broadcast wave with a tuner 31 is supplied to a received-signal processor 32. The received-signal processor 32 generates a video intermediate frequency signal VIF and a sound intermediate frequency signal SIF from the received signal RF. The generated sound intermediate frequency signal SIF is supplied to a voice or sound demodulator 33, whereas the video intermediate frequency signal VIF is supplied to a video-system signal processor 41.

The sound demodulator 33 amplifies and detects the sound intermediate frequency signal SIF to thereby produce an audio or sound signal Sa corresponding to a baseband signal. The audio signal Sa is supplied to a signal separator 34 and a signal mixer 37.

The signal separator 34 separates a frequency-shifted keyed signal indicative of the program reservation information from the audio signal Sa and demodulates it. Further, the signal separator 34 effects an error detection and correction process on the demodulated signal to thereby produce information data Da, which in turn is stored in a data storage unit 35 comprised of a memory or the like.

The information data Da stored in the data storage unit 35 is read out based on a control signal CT supplied from a control code determinator 53 to be described later, followed by supply to an FSK encoder 36.

The FSK encoder 36 adds data indicative of the start and end of the information data Da as well as error detection and correction data or the like to the read information data Da to thereby produce a signal set to a predetermined format. Further, the FSK encoder 36 frequency-shift keys this signal so as to generate an information signal DM lying within an audio frequency band. The information signal DM is supplied to the signal mixer 37.

The signal mixer 37 mixes the read information signal DM and the audio signal Sa outputted from the sound demodulator 33 to generate a sound output signal Smix. A sound amplifier 38 amplifies the sound output signal Smix and supplies the amplified signal to the speakers 39. Therefore, the sound of the broadcast program and the sound of the modulated signal indicative of the program reservation information are outputted from the speakers 39.

Further, the information data Da stored in the data storage unit 35 is read out based on the control signal CT outputted from the control code determinator 53 and thereafter supplied to a display signal generator 40. The display signal generator 40 produces the information data Da as a video signal VD used for the display of the program reservation information and supplies it to the video-system signal processor 41.

The video-system signal processor 41 generates a primary signal RGB from the video intermediate frequency signal VIF outputted from the received-signal processor 32 and the video signal VD outputted from the display signal generator 40 and supplies it to an image receiving or picture tube 42. Therefore, the program reservation information is displayed on the screen of the picture tube 42 together with the videos of the broadcast program.

Further, the television system 30 is provided with the remote-control signal receiver 51 comprised of, for example, a photodiode, which receives therein a remote-control signal RM outputted from the remote-controlled transmitter 10, using infrared light and generates a remote-control received signal KR. A demodulator 52 demodulates the remote-control received signal KR and supplies the demodulated signal to the control code determinator 53 as a control code signal MR.

The control code determinator 53 determines or discriminates a code for the control code signal MR. Further, the control code determinator 53 generates a control signal CT according to the result of determination and supplies it to the data storage unit 35.

The configuration of the remote-controlled transmitter 10 will next be explained. Referring to FIG. 3, a command generator 11 of the remote-controlled transmitter 10 is made up of a microcomputer, an oscillation circuit, etc. The command generator 11 generates a control code signal MA for controlling the operations of, for example, the television system 30 and the video tape recorder 60 in response to an operation signal PL1 outputted from operation buttons 12 electrically connected to the command generator 11. Further, the command generator 11 generates a control code signal MB for outputting the information data Da stored in the television system 30 as a voice or sound, based on an operation signal PL2 outputted from a capture button 13 and a detected signal CK outputted from an FSK decoder 22 to be described later. The control code signal MA and control code signal MB generated from the command generator 11 are supplied to a modulator 26.

The microphone 21 collects the sound SO outputted from each individual speaker 39 of the television system 30 to generate a microphone signal Smic. The generated microphone signal Smic is supplied to the FSK decoder 22.

The FSK decoder 22 demodulates the modulated signal indicative of the program reservation information included in the microphone signal Smic and effects the error detection and correction process or the like on it to thereby produce the so-processed signal as information data Db, which in turn is supplied to a format converter 23.

The format converter 23 determines information about the information data Db and generates a control code signal MS for setting a program reservation based on the information. The generated control code signal MS is stored in a memory 24.

A program reservation setter 15 is electrically connected to the memory 24. A control code signal MC generated under the control of an operation button of the program reservation setter 15 with a view toward setting the program reservation is also stored in the memory 24. Incidentally, the control code signal MC may be generated from the command generator 11 according to the control of the operation button of the program reservation setter 15.

A transfer button 16 is electrically connected to the memory 24. With the transfer button 16 operated, an operation signal PL3 is supplied to the memory 24 where either the control code signal MS based on the sound SO of the television system 30 or the control code signal MC outputted from the program reservation setter 15 is selected and from which the selected signal is read out and supplied to the modulator 26.

The modulator 26 has an oscillator for generating, for example, a carrier signal of 40 kHz. The carrier signal is supplied to the remote-control signal output unit 27 as a drive signal KT amplitude-modulated by the control code signal MA or control code signal MB supplied from the command generator 11 and the control code signal MC or control code signal MS read from the memory 24.

The remote-control signal output unit 27 comprises an infrared-emitting diode, for example, which is driven in response to the drive signal KT supplied from the modulator 26, so that a remote-control signal RM is outputted from the remote-control signal output unit 27 through the use of infrared light.

The operation will next be described. When the operation buttons 12 is operated to allow the remote-controlled transmitter 10 to perform operations different from the program reservation setting, such as a channel switching operation of the television system 30, a tape playback operation of the video tape recorder 60, etc., a operation signal PL1 is supplied to the command generator 11. The command generator 11 sets an operating clock frequency to a low frequency to reduce power consumption during a period free of remote control. When the operation signal PL1 is supplied to the command generator 11, the operating clock frequency is raised to a predetermined frequency. With the operation buttons 12 manipulated, power is supplied to the modulator 26 so that a carrier signal of, for example, 40 kHz is generated.

The command generator 11 produces a control code signal MA, based on the operation signal PL1 and supplies it to the modulator 26. The modulator 26 amplitude-modulates the carrier signal based on the control code signal MA to produce a drive signal KT, which in turn is supplied to the remote-control signal output unit 27. Therefore, the remote-control signal output unit 27 outputs a remote-control signal RM according to the operation of the operation buttons 12. Thus, the operations of the television system 30, and the video tape recorder 60, and the like are controlled based on the remote-control signal RM.

Next, when it is desired to perform a program reservation, operation buttons of the program reservation setter 15 are actuated to generate a control code signal MC indicative of a program reservation set information such as a recording time, a channel, etc. and the generated control code signal MC is stored in the memory 24. Thereafter, when the transfer button 16 is operated, the control code signal MC is read out from the memory 24 based on an operation signal PL3 supplied from the transfer button 16. The read control code signal MC is amplitude-modulated by the modulator 26 so as to be produced as the drive signal KT, after which it is supplied to the remote-control signal output unit 27. Therefore, a remote-control signal RM corresponding to the program reservation information set under the control of the program reservation setting buttons is outputted from the infrared-emitting diode of the remote-control signal output unit 27. As a result, the setting of the program reservation to the video tape recorder or the like is carried out based on the remote-control signal RM.

When an attempt is made to perform the program reservation, using program reservation information transmitted from a broadcast station, the program reservation information is stored in the television system 30 and read out by the remote-controlled transmitter 10 to thereby carry out the program reservation. In the television system 30 in this case, information data Da indicative of the program reservation information superimposed on the audio or sound signal of the program is stored in the data storage unit 35.

When the information data Da stored in the data storage unit 35 is read out, the capture button 13 of the remote-controlled transmitter 10 is operated so that an operation signal PL2 is supplied to the command generator 11, the FSK decoder 22, and the like.

The command generator generates a control code signal MB indicative of a first predetermined control code signal for reading the information data Da from the data storage unit 35 in the television system 30 and outputting the information data Da as a voice or sound from the speakers 39.

In the television system 30, the remote-control signal receiver 51 receives the remote-control signal RM therein to thereby generate a remote-control received signal KR. The demodulator 52 demodulates the remote-control received signal KR and the control code determinator 53 determines a code for a control code signal MR demodulated by the demodulator 52 and thereby generates a control signal CT according to the result of determination. Since the remote-control signal RM corresponds to a signal based on the control code signal MB for reading the information data Da form the data storage unit 35 of the television system 30, the information data Da indicative of the program reservation information stored in the data storage unit 35 is read out and processed based on the control signal CT. Thereafter, the read information data Da is outputted from the speakers 39 as a sound together with the sound of the program.

In the remote-controlled transmitter 10, the microphone 21, the FSK decoder 22, the format converter 23, and the like are supplied with the power in accordance with the operation signal PL2 produced when the capture button 13 is operated. As a result, the respective components start operating.

Now, the sound outputted from the television system 30 is collected by the microphone 21 of the remote-controlled transmitter 10 to produce a microphone signal Smic. The produced microphone signal Smic is demodulated to generate information data Db. Further, the format converter 23 generates a control code signal MS based on the generated information data Db, and the memory 24 stores the control code signal MS therein.

In the FSK encoder 36 of the television system 30, data indicative of the end of the information data Da is added to the read information data Da. When the data indicative of the end thereof is detected by the FSK decoder 22, a detected signal CK is supplied to the command generator 11. The command generator 11 generates a second predetermined control code signal for stopping the output of the program reservation information based on the detected signal CK. Further, the remote-control signal output unit 27 sends or outputs a remote-control signal RM to the remote-control signal receiver 51 of the television system 30 based on the second predetermined control code signal.

The television system 30 makes a decision as to whether the code for the control code signal MR based on the remote-control received signal KR is a code for terminating the output of the program reservation information. As a result, the reading of the information data Da indicative of the program reservation information stored in the data storage unit 35 is completed.

When the information indicative of the end is not detected from the sound SO indicative of the program reservation information outputted from the speakers 39 of the television system 30, the information data Da is repeatedly read, for example, a predetermined number of times in the television system 30. Further, when the information indicative of the end is not detected even if the reading is repeated, the improper transfer of the program reservation information may be displayed on the remote-controlled transmitter 10 or the television system 30.

The control code signal MS indicative of the program reservation information is stored in the memory 24 of the remote-controlled transmitter 10 in this way. When the transfer button 16 is now operated, the control code signal MS is read from the memory 24. The read control code signal MS is amplitude-modulated by the modulator 26 so as to be produced as a drive signal KT, which in turn is supplied to the remote-control signal output unit 27. Therefore, the program reservation information transmitted from the broadcast station can be transferred from the remote-controlled transmitter 10 to the video tape recorder 60 and the like.

Thus, the program reservation information sent from the broadcast station is stored in the television system 30 and the program reservation information is transferred from the television system 30 to the remote-controlled transmitter 10 by the sound SO in accordance with the remote-control signal RM sent from the remote-controlled transmitter 10. Further, since the end of the program reservation information is also detected, the program reservation information can be reliably stored in the remote-controlled transmitter 10. Thus, the program reservation can be set properly and easily by transferring the stored information to the video tape recorder and the like.

Further, the information data Da stored in the data storage unit 35 of the television system 30 is read out and supplied to the display signal generator 40 where the information data Da is produced as a video signal VD. Further, the video signal VD is supplied to the video-system signal processor 41. Therefore, the stored program reservation information is displayed on the screen of the picture tube 42. It is therefore possible to easily determine using this display whether the information is required or not. Assuming now that the data storage unit 35 is set to a capacity for allowing it to store a plurality of pieces of information and the plurality of pieces of information stored therein are displayed on the screen, a remote-control signal RM based on a third predetermined control code is outputted from the remote-controlled transmitter 10 and any of the displayed plural pieces of information may be selected and transferred.

Further, when the end of the information is detected by the remote-controlled transmitter 10, the transferred information is deleted from the data storage unit 35. On the other hand, if the pieces of information are successively deleted from, for example, the oldest information when the capacity left available on the data storage unit 35 is small and the new information can be stored therein, then the data storage unit 35 can be efficiently utilized.

Further, the program reservation information can be outputted as the sound not only from the television system 30 but also through a communication line such as a telephone and the like. Since the program reservation information must fall within a band of 3 kHz when the program reservation information is sent through a telephone line, the information is frequency-shift keyed to 400Hz and 800 Hz, for example. Since a telephone line increased in noise is used, the ability to detect and correct an error is enhanced. Further, since a band of 10 kHz or above can be taken in a television broadcast system, the transfer of the information between the television broadcast system and the telephone line may preferably be carried out in other modes different in carrier frequency, error detection and correction capability and protocol, and the like.

According to the aforementioned embodiment, as described above, since the program reservation information can be transferred through the use of the sound, the remote-controlled transmitter can be simplified in circuit configuration and configured at low cost as compared with the transfer of the program reservation information using radio waves, for example. Although the infrared receptor large in power consumption must be activated until the transfer of the information is finished when the program reservation information is transferred using the infrared rays, the power consumption can be reduced by using the sound. Thus, the present invention is suitable for use. in a battery-driven device such as a remote-controlled transmitter and the like.

Since the information is transferred through the use of the sound, even the already-used television equipment, radio, telephone, and the like can transfer the information without the need for newly providing a signal output unit and the like for outputting infrared light or newly ensuring a frequency band for transferring the information.

In the aforementioned embodiment, the information to be transferred with the program reservation information intended for transfer is not necessarily limited to the program reservation information. For example, URL (Uniform Resource Locator) information in an internet is broadcasted together with a program and transferred from a television system to a personal computer, whereby an access to a desired home page can be easily achieved.

According to the present invention, information data indicative of information used to set the operation of a device to be controlled is outputted from an information output apparatus as a sound. The sound is collected by a remote-controlled transmitter to generate a control code signal for controlling the operation of the device to be controlled. Further, a remote-controlled signal is generated based on the control code signal and outputted from the remote-controlled transmitter to the device to be controlled. Thus, the information stored in the information output apparatus can be properly and easily transferred to the device to be controlled. Further, since the information is transferred by the sound, the already-used television system, radio, telephone, etc. can be utilized. Moreover, the information can be transferred without a great increase in cost and power consumption of the remote-controlled transmitter by using the sound.

While the present invention has been described with reference to the illustrative embodiments, this description is not intended to be construed in a limitative sense. Various modifications of the illustrative embodiments, as well as other embodiments of the invention, will be apparent to those skilled in the art on reference to this description. It is therefore contemplated that the appended claims will cover any such modifications or embodiments as they fall within the true scope of the invention.

What is claimed is:

1. An information transfer comprising:
    an information output apparatus for converting information data indicative of information used to set the operation of a device to be controlled into a sound and outputting the sound therefrom; and a remote-controlled transmitter for gathering the sound outputted from said information output apparatus to obtain said information data, generating a control code signal for controlling the operation of said device to be controlled based on the information data, generating a remote-controlled signal based on the control code signal, and outputting the remote-control signal therefrom to said device, wherein said information output apparatus includes, data storing means for storing the information data therein; and signal receiving means for receiving the remote-control signal outputted from said remote-controlled transmitter therein, said remote-controlled transmitter is capable of outputting a remote-control signal based on a plurality of predetermined control code signals in place of the control code signal, and said information output apparatus reads the information data stored in said data storing means, converts the read information data into a sound and outputs the sound therefrom when a remote-control signal based on a first predetermined control code signal is outputted from said remote-controlled transmitter and the remote-control signal is received by said signal receiving means of said information output apparatus, wherein said information output apparatus makes a decision as to whether said remote-control signal is terminated and when the termination of said remote-control signal is detected, said read information data is deleted from said data storing means.

2. An information transfer system according to claim 1, wherein said information output apparatus reads the information data from said data storing means until said signal receiving means receives a remote-control signal based on a second predetermined control code signal, adds data indicative of the end of the information data to said read information data, converts the so-processed data into a sound, and outputs the sound therefrom, and said remote-controlled transmitter outputs the remote-control signal based on said second predetermined control code signal when the data indicative of the end of said information data is detected based on the gathered sound.

3. An information transfer system according to claim 1, wherein said data storing means of said information output apparatus updates the read information data or the oldest information data to new information data.

4. An information transfer system according to claim 1, wherein said information output apparatus is a television system, which allows said data storing means to store information data indicative of information obtained from a program broadcast and used to set the operation of said device to be controlled and allows the information represented by the information data stored in said data storing means to be displayed on the screen thereof.

5. An information transfer system according to claim 4, wherein said remote-controlled transmitter outputs a remote-control signal based on a third predetermined control code signal for selecting the information displayed on the screen of said information output apparatus, and said information output apparatus reads desired information data from said data storing means, converts the read information data into a sound and outputs the sound therefrom in response to the remote-control signal based on the third predetermined control code signal received by said signal receiving means.

6. An information transfer system according to claim 1, wherein said information output apparatus is a telephone set.

7. An information transfer system according to claim 1, wherein the information used to set the operation of said device to be controlled is program reservation information for effecting a record reservation on a video tape recorder.

8. An information transferring method comprising the following steps:

an information output step for converting information data indicative of information used to set the operation of a device to be controlled into a sound and outputting the sound therefrom; and a remote-control transmitting step for gathering the sound outputted from said information output step to obtain said information data, generating a control code signal for controlling the operation of a second device to be controlled based on the information data, generating a remote-control signal based on the control code signal, and outputting the remote-control signal therefrom to said device, wherein said information output apparatus includes, data storing means for storing the information data therein; and signal receiving means for receiving the remote-control signal outputted from said remote-controlled transmitter therein, said remote-controlled transmitter is capable of outputting a remote-control signal based on a plurality of predetermined control code signals in place of the control code signal, and said information output apparatus reads the information data stored in said data storing means, converts the read information data into a sound and outputs the sound therefrom when a remote-control signal based on a first predetermined control code signal is outputted from said remote-controlled transmitter and the remote-control signal is received by said signal receiving means of said information output apparatus, wherein said information output apparatus makes a decision as to whether said remote-control signal is terminated and when the termination of said remote-control signal is detected, said read information data is deleted from said data storing means.

* * * * *